United States Patent
Otts

(10) Patent No.: US 8,538,167 B2
(45) Date of Patent: Sep. 17, 2013

(54) DESIGNATING CORRIDORS TO PROVIDE ESTIMATES OF STRUCTURES

(75) Inventor: Daniel W. Otts, Allen, TX (US)

(73) Assignee: Raytheon Company, Waltham, MA (US)

( * ) Notice: Subject to any disclaimer, the term of this patent is extended or adjusted under 35 U.S.C. 154(b) by 925 days.

(21) Appl. No.: 12/683,924

(22) Filed: Jan. 7, 2010

(65) Prior Publication Data
US 2011/0164821 A1    Jul. 7, 2011

(51) Int. Cl.
*G06K 9/48*    (2006.01)

(52) U.S. Cl.
USPC ............ 382/203; 382/149; 382/154; 382/145

(58) Field of Classification Search
USPC .......................................... 382/149, 154, 145
See application file for complete search history.

(56) References Cited

U.S. PATENT DOCUMENTS

| | | | |
|---|---|---|---|
| 5,699,447 A | 12/1997 | Alumot et al. | |
| 5,982,921 A | 11/1999 | Alumot et al. | |
| 6,064,759 A | 5/2000 | Buckley et al. | |
| 6,178,257 B1 | 1/2001 | Alumot et al. | |
| 6,330,523 B1 | 12/2001 | Kacyra et al. | |
| 6,333,992 B1* | 12/2001 | Yamamura et al. | 382/149 |
| 6,501,414 B2 | 12/2002 | Arndt et al. | |
| 6,952,491 B2 | 10/2005 | Alumot et al. | |
| 7,053,820 B2 | 5/2006 | Goodman et al. | |
| 7,062,417 B2 | 6/2006 | Kruger et al. | |
| 7,151,976 B2 | 12/2006 | Lin | |
| 7,279,258 B2* | 10/2007 | Goodwin | 430/30 |
| 7,307,575 B2 | 12/2007 | Zemany | |
| 7,333,648 B2* | 2/2008 | Edic et al. | 382/131 |
| 7,499,583 B2 | 3/2009 | Alumot et al. | |
| 7,526,405 B2 | 4/2009 | Miller et al. | |
| 7,796,807 B2 | 9/2010 | Alumot et al. | |
| 8,023,563 B2* | 9/2011 | Vella et al. | 375/240.22 |
| 8,102,305 B2* | 1/2012 | Otts | 342/52 |
| 8,164,507 B2* | 4/2012 | Howe et al. | 342/22 |
| 2002/0100872 A1* | 8/2002 | Hiroi et al. | 250/310 |
| 2003/0097244 A1* | 5/2003 | Davis et al. | 703/6 |
| 2007/0241738 A1 | 10/2007 | Baranauskas et al. | |
| 2008/0050035 A1* | 2/2008 | Tsurumi | 382/276 |

(Continued)

FOREIGN PATENT DOCUMENTS

EP    1 777 550 A1    4/2007

OTHER PUBLICATIONS

Leavers, V. F., ed., "Shape Detection in Computer Vision Using the Hough Transform", Towards a Representation of Shape, XP007914240, ISBN: 978-3-540-19723-2, pp. 88-107, Jan. 1, 1992.

(Continued)

*Primary Examiner* — Vu Le
*Assistant Examiner* — Aklilu Woldemariam
(74) *Attorney, Agent, or Firm* — Cantor Colburn LLP

(57) ABSTRACT

In particular embodiments, analyzing data includes receiving sensor data generated in response to sensing one or more structures. The structural features of the sensor data are identified. Each structural feature is represented by one or more vectors. A score matrix describing relationships among the vectors is generated. Candidate corridors are identified from at least some of the vectors according to the score matrix. One or more candidate corridors are designated as designated corridors. Each designated corridor comprises an opening defined by at least two structural features. A layout of the structures is generated from the structural features and the designated corridors.

20 Claims, 3 Drawing Sheets

(56) References Cited

U.S. PATENT DOCUMENTS

| | | |
|---|---|---|
| 2009/0033539 A1 | 2/2009 | Zemany |
| 2009/0141587 A1* | 6/2009 | Welker et al. ............... 367/16 |
| 2009/0243916 A1 | 10/2009 | Beeri et al. |
| 2009/0289830 A1 | 11/2009 | Pergande et al. |
| 2009/0295618 A1 | 12/2009 | Beeri et al. |
| 2010/0134285 A1 | 6/2010 | Holmquist |

OTHER PUBLICATIONS

Tat Soon Yeo, et al., "*A New Subaperture Approach to High Squint SAR Processing*", IEEE Transactions on Geoscience and Remote Sensing, vol. 39, No. 5, XP011021759A, ISSN: 0196-2892, pp. 954-968, May 1, 2001.

Bin Luo, et al., "*Graph Spectral Approach for Learning View Structure*", 16th International Conference on Pattern Recognition (ICPR '02), vol. 3, XP010613741A, ISBN: 978-0-7695-1695-0, pp. 785-788. Aug. 11, 2002.

Ma Yi et al., "*An invitation to 3-D Vision, Representation of a Three-Dimensional Moving Scene, Quaternions and Euler Angles for Rotations*", Springer Verlag, Berlin, XP007914241, ISBN: 978-0-387-00893-6, pp. 390-403, Jan. 1, 2004.

Zhiguang Zhong, et al., "*Pose Estimation and Structure Recovery from Point Pairs*", Proceedings of the 2005 IEEE International Conference on Robotics and Automation, Barcelona, Spain, XP010872265A, ISBN: 978-0-7803-8914-4, pp. 442-447, Apr. 18, 2005.

Zhiguang, Zhong, et al., "*Effective pose estimation from point pairs*", Image and Vision Computing, Elsevier, vol. 23, No. 7, XP004921786, ISSN: 0262-8856, pp. 651-660, Jul. 1, 2005.

Roberto Nerino, "*Automatic registration of point-based surfaces*", WSEAS Transactions on Computers, Issue 12, vol. 5, ISSN: 1109-2750, XP8125025A, pp. 2984-2991, Dec. 1, 2006.

Dr. Christophe Gouinaud, "*SAR Image Fusion in Multi Sensor Context for Small Urban Area Detection*", IGARSS, IEEE, XP031422669, ISBN: 978-'-4244-2807-6, pp. III-988 thru III-991, Jul. 7, 2008.

PCT, Notification of Transmittal of the International Search Report and the Written Opinion of the International Searching Authority, or the Declaration, International Application No. PCT/US2010/031824, 16 pages, Aug. 12, 2010.

U.S. Appl. No. 12/686,428 entitled "*Fusing Structures From Multi-Sensor Data*", by Daniel W. Otts, 30 pages, filed Jan. 13, 2010.

U.S. Appl. No. 12/686,467 entitled "*Fusing Multi-Sensor Data Sets According to Relative Geometrical Relationships*", by Daniel W. Otts, 36 pages, filed Jan. 13, 2010.

Inventor Benjamin M. Howe et al., "Fusing Multi-Sensor Data to Provide Estimates of Structures," U.S. Appl. No. 12/427,474, 35 pages, Apr. 21, 2009.

USPTO Office Action, U.S. Appl. No. 12/427,474 to Benjamin H. Howe; 11 pages, dated Mar. 28, 2011.

Jean-Philippe Thirion, "*New Feature Points based on Geometric Invariants for 3D Image Registration*", International Journal of Computer Vision, vol. 18, No. 2, pp. 121-137, May 1, 1996.

Roberto Nerino, "*Invariant features for automatic coarse registration of point-based surfaces*", Proc. of the 6th WSEAS Int. Conf. on Signal Processing, Computational Geometry & Artificial Vision, Elounda, Greece, XP-002634722, pp. 10-15, Aug. 21-23, 2006.

Marinella Cadoni, et al., "*3D Face Recognition Using Joint Differential Invariants*", Advances in Biometrics, Springer Berlin Heidelberg, Berlin, Heidelberg, XP019117937, pp. 279-288, Jun. 2, 2009.

PCT Notification of Transmittal of the International Search Report and the Written Opinion of the International Searching Authority, or the Declaration, International Application No. PCT/US2011/020726, 13 pages, May 10, 2011.

Wenxia, Shi, et al. "Investigating the Performance of Corridor and Door Detection Algorithms in Different Environments", Information and Automation, 2006, ICIA 2006. International Conference on, IEEE, Dec. 1, 2006 pp. 206-211.

Holland, John, "Designing Autonomous Mobile Robots: Inside the Mind of an Intelligent Machine", Dec. 29, 2003, Newness, pp. 1-352.

Newman, P., et al., "Outdoor Slam using visual appearance and laser ranging" Robotics and Automation, 2006, ICRA 2006 Proceedings 2006 IEEE International Conference at Orlando, Fl. May 15-19, 2006 IEEE, May 15, 2006, pp. 1180-1187.

Siagian, C., et al., "Biologically Inspired Mobile Robot Vision Localization", IEEE Service Center, vol. 25, No. 4, Aug. 1, 2009, pp. 861-873.

Stilla, U. et al., "Potential and limits of InSAR data for building reconstruction in built-up areas" ISPRS Journal of Photogrammetry and Remote Sensing, vol. 58, No. 1-2, Jun. 1, 2003, pp. 113-123.

Nerino, R., "Automatic registration of point-based surfaces", WSEAS Transactions on Computers World Scientific and Engineering Academy and Society, vol. 5, No. 12, Dec. 1, 2006 pp. 2984-2991.

Notification of Transmittal of the International Search Report and the Written Opinion of the International Search Authority, or the Declaration, PCT/US2011/020064 dated Mar. 16, 2011, 13 pages.

Kruskal, J.B., "*Multidimensional Scaling by Optimizing Goodness of Fit to a Nonmetric Hypothesis*", Psychometrika, vol. 29, No. 1, XP008130844, 27 pages, Mar. 1, 1964.

Lee, Sang-Chul, et al., "*Multisensor Raster and Vector Data Fusion Based on Uncertainty Modeling*", 2004 International Conference on Image Processing (ICIP), IEEE, pp. 3355-3358, Oct. 2004.

PCT, Notification of Transmittal of the International Search Report and the Written Opinion of the International Searching Authority, or the Declaration, International Application No. PCT/US2010/053095, 14 pages, Mar. 9, 2011.

\* cited by examiner

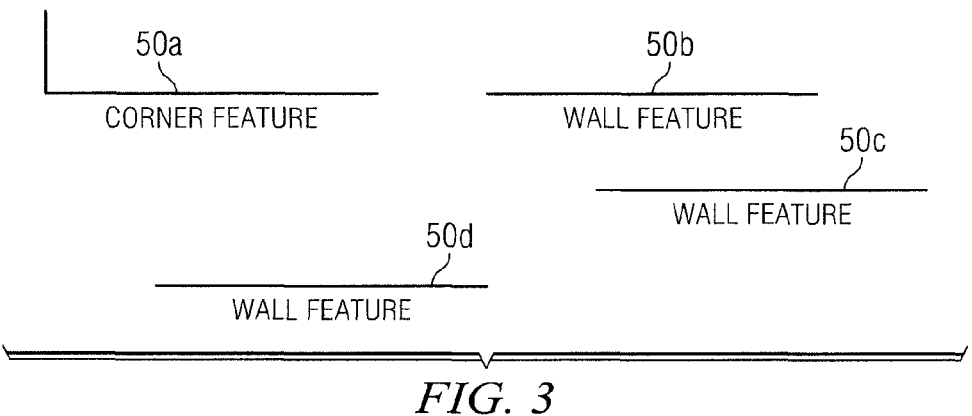
FIG. 3
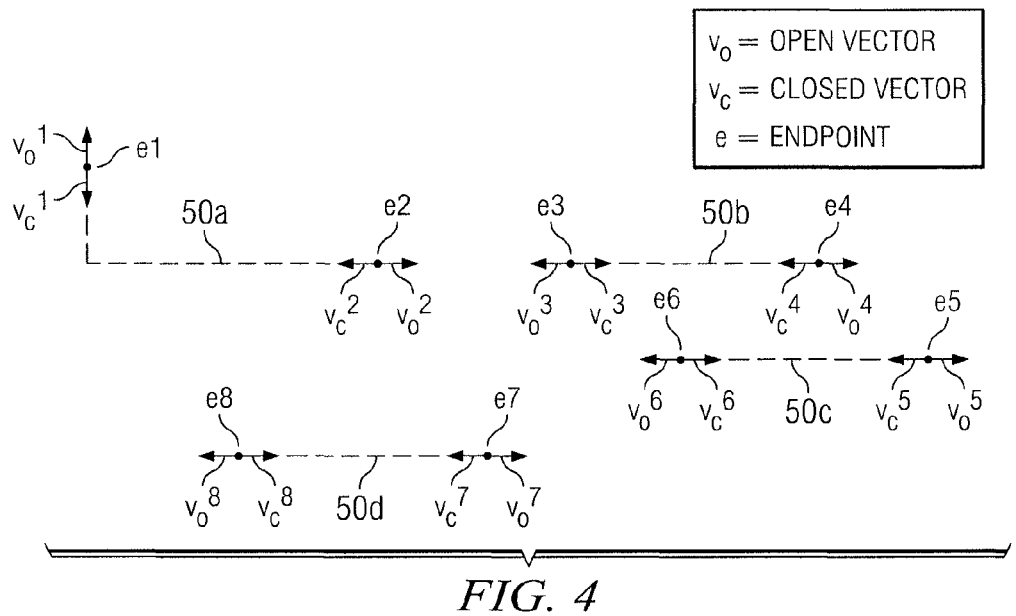
FIG. 4
FIG. 5

DESIGNATING CORRIDORS TO PROVIDE ESTIMATES OF STRUCTURES

TECHNICAL FIELD

This invention relates generally to the field of sensor data analysis and more specifically to designating corridors to provide estimates of structures.

BACKGROUND

Enforcement, security, and military forces may perform operations in structures such as buildings. These forces may need to know the layout, for example, the floor plan, of the structures. In certain situations, however, the layout may not be available.

SUMMARY OF THE DISCLOSURE

In accordance with the present invention, disadvantages and problems associated with previous techniques for fusing multi-sensor data may be reduced or eliminated.

In particular embodiments, analyzing data includes receiving sensor data generated in response to sensing one or more structures. The structural features of the sensor data are identified. Each structural feature is represented by one or more vectors. A score matrix describing relationships among the vectors is generated. Candidate corridors are identified from at least some of the vectors according to the score matrix. One or more candidate corridors are designated as designated corridors. Each designated corridor comprises an opening defined by at least two structural features. A layout of the structures is generated from the structural features and the designated corridors.

Certain embodiments of the invention may provide one or more technical advantages. A technical advantage of one embodiment may be that structural features indicated by sensor data are represented by vectors. The vectors are then placed in a score matrix in order to determine navigable corridors defined by the structural features. Another technical advantage of one embodiment may be that corridors may be designated as doorways or gaps. The designated doorways and gaps aid in the identification of structures sensed by the sensors.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 illustrates examples of structural features;

FIG. 4 illustrates representing the structural features of FIG. 3 by vectors;

FIG. 5 illustrates the orientations and locations of the open vectors of FIG. 4;

DETAILED DESCRIPTION OF THE DRAWINGS

Embodiments of the present invention and its advantages are best understood by referring to FIGS. 1 through 8 of the drawings, like numerals being used for like and corresponding parts of the various drawings.

Figure 1:
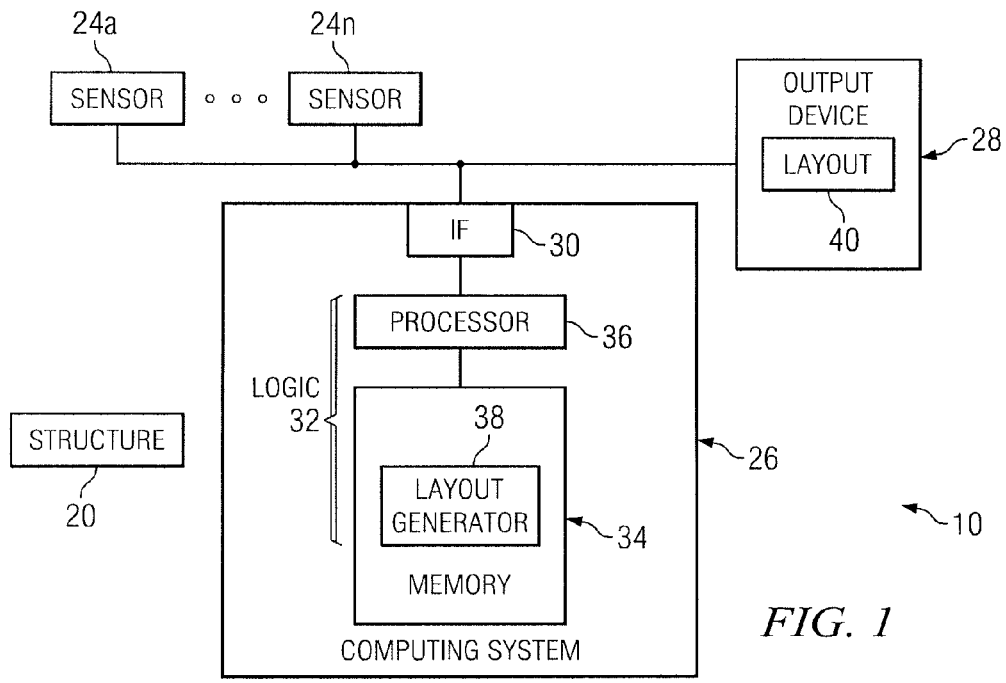
FIG. 1 illustrates one embodiment of a system configured to designate corridors to provide estimates of structures.

FIG. 1 illustrates one embodiment of a system 10 configured to designate corridors to provide estimates of structures 20. In the illustrated embodiment, system 10 includes sensors 24, a computing system 26, and an output device 28. Computing system 26 includes an interface (IF) 30, logic 32, and memory 34. Logic 32 includes a processor 36 and applications such as a layout generator 38. Output device 28 displays a layout 40.

In certain embodiments, system 10 receives sensor data from one or more sensors 24 sensing structures 20 and generates layout 40 of structures 20. In the embodiments, system 10 represents structural features indicated by sensor data by vectors, and places the vectors in a score matrix. System 10 then identifies candidate corridors between pairs of vectors according to the score matrix. System 10 designates candidate corridors as designated corridors according to the alignment of the structural features and the corridor. The designated corridors are used to determine structures 20 sensed by the sensors.

In the illustrated embodiment, structures 20 may be one or more natural and/or manmade physical objects. Examples of structures 20 include buildings such as military, corporate, residential, academic, or medical buildings. In certain embodiments, a structure 20 may have internal features that are not visible outside of structure 20. For example, a building may have rooms bordered by walls such that the rooms are not visible outside of the building. The layout of the structure, such as the floor plan of a building, may describe at least some of these internal features.

Structures 20 may have structural features that are physical features of the geometry of the structure. For example, the structural features of the building may include walls of a room and corners of a room where two walls meet. Structural features may be used to generate a layout 40 of the structures 20. The layout of a room may be provided in two dimensions (2D) or three dimensions (3D). A wall, or "plate," may be represented by a line in a two-dimensional layout or a plane in a three-dimensional layout. A corner may be represented by a type of n-hedral, which is a set of n lines with a common point, where n is an integer. The common point may be called the "corner point." A corner may be represented by a dihedral, or 2-hedral, in a two-dimensional layout or a trihedral, or 3-hedral, in a three-dimensional layout.

Structural features may define openings, such as navigable corridors of the structures 20. Examples of corridors may include doorways and gaps. A doorway may be an opening between structural features, such as walls, for entering and exiting the structure or a room of the structure. A gap may be an opening between structural features that does not possess characteristics of a typical doorway. For example, a gap may be larger than a typical doorway. A gap may indicate the presence of certain internal features of the structures 20, such as stairwells.

Sensors 24 may generate sensor data in response to sensing one or more structures 20. The sensor data may describe the structural features of the structures. Sensor 24 may be any suitable sensing device. Examples of sensor 24 include radar sensors, video cameras, camcorders, closed-circuit television cameras, digital cameras, surveillance cameras, infrared cameras, x-ray cameras, and/or satellite cameras. In certain embodiments, more than one sensor 24 may send data to computing system 26.

Computing system 26 receives sensor data from one or more sensors 24 and fuses the sensor data to generate a layout 40 of structures 20. Interface 30 receives input, sends output, processes the input and/or output, and/or performs other suitable operation. Interface 30 may comprise hardware and/or software.

Logic 32 performs the operations of the component, for example, executes instructions to generate output from input. In certain embodiments, layout generator 38 generates a layout 40 of structures 20. In the embodiments, layout generator 38 receives sensor data and identifies structural features of the sensor data. Layout generator 38 represents the structural features by vectors, and generates a score matrix that describes relationships among the vectors. Layout generator 38 identifies candidate corridors from the vectors according to the score matrix. In some embodiments, layout generator 38 may test a width of each candidate corridor to determine whether to designate the corridor as a doorway or a gap. Layout generator 38 designates designated corridors from at least some of the candidate corridors. For example, layout generator 38 may designate a candidate corridor as a designated corridor if the corridor substantially aligns with the walls that define it. Layout generator 38 estimates structures according to the structural features and the designated corridors. A method that layout generator 38 may use to generate layout 40 is described in more detail with respect to FIG. 2.

Logic 32 may include hardware, software, and/or other logic. Logic 32 may be encoded in one or more tangible media and may perform operations when executed by a computer. Certain logic 32, such as processor 36, may manage the operation of a component. Examples of a processor 36 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 34 stores information an applications such as layout generator 38. Memory 34 may comprise one or more tangible, computer-readable, and/or computer-executable storage medium. Examples of memory 34 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. Output device 28 outputs layout 40 generated by computing system 26.

Output device may provide layout 40 in any suitable manner, for example, as a visual display, a printed hard copy, or an audio file. Examples of output device 28 includes a computer display, a printer, or a speaker.

Figure 2:
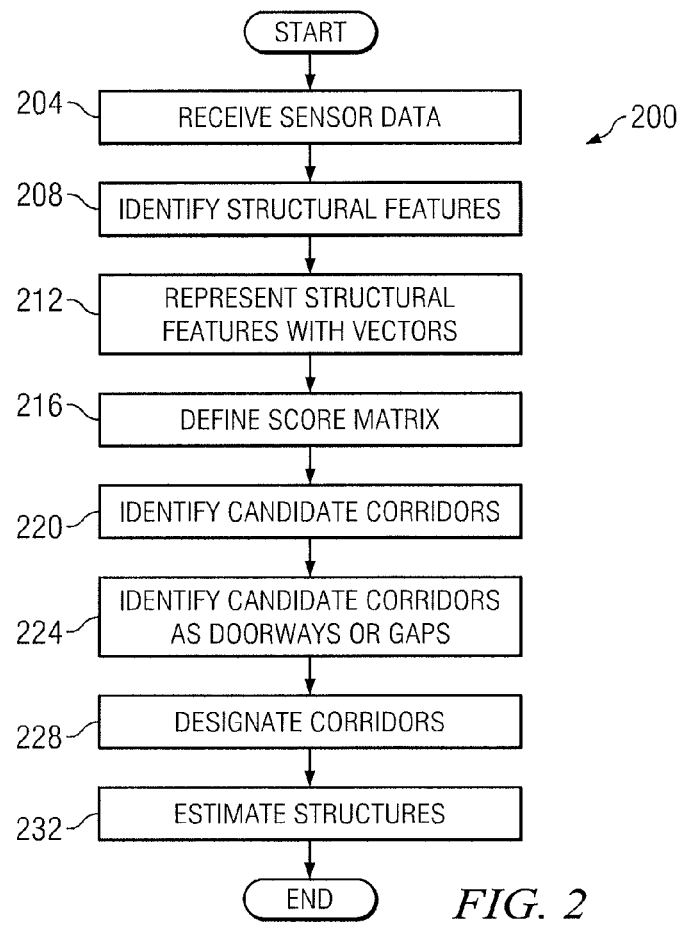
FIG. 2 illustrates an example of a method for designating corridors to provide estimates of structures.

FIG. 2 illustrates an example of a method 200 for designating corridors to provide estimates of structures. The method may be performed by system 10 of FIG. 1.

In certain embodiments, sensor data is received at step 204. The sensor data may be generated in response to sensing structures 20 and may describe structural features of structures 20. The structural features of the sensor data are identified at step 208. The structural features of the sensor data may be identified in any suitable manner.

In some embodiments, portions of sensor data that are likely to represent the same physical feature, such as a wall or a corner of a structure, may be identified as a structural feature. As an example, portions of sensor data representing physical features proximate to each other, such as physical features within less than 2 inches of each other, may be likely to represent the same physical feature. In some embodiments, sensor data may comprise data received from multiple sensors, and identifying the structural features may include fusing the data. FIG. 3 illustrates examples of structural features comprising corner feature 50$a$ and wall features 50$b$, 50$c$, and 50$d$.

Referring back to FIG. 2, the method represents each structural feature by one or more vectors at step 212 to yield a plurality of vectors. A structural feature may be represented by vectors in any suitable manner.

FIG. 4 illustrates representing the structural features of FIG. 3 by vectors. In certain embodiments, a structural feature is represented by at least one endpoint (e) and a set of vectors comprising at least one open vector ($v_o$) and at least one closed vector ($v_c$). An open vector originates at the endpoint and points in the direction of the space beside a wall. A closed vector originates at the endpoint and points towards the wall itself. In some embodiments, the open vector and the closed vector may be co-linear with the line representing the wall.

Referring back to FIG. 2, the method may define a score matrix at step 216. A score matrix describes one or more relationships among the open vectors. Examples of relationships include relative orientation, relative location, and distance. The score matrix may be an M×M matrix, where M represents the number of open vectors.

Figure 6:
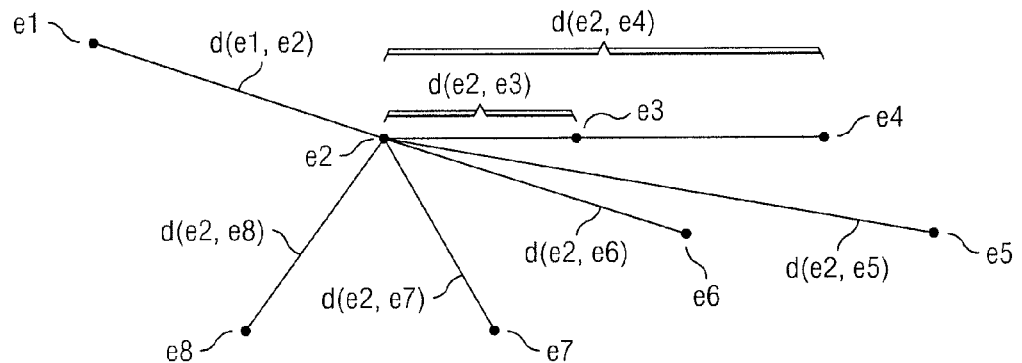
FIG. 6 illustrates examples of distances between vector endpoints.

In some embodiments, a score matrix may be calculated by multiplying an orientation mask describing the orientation relationships, a location mask describing the location relationships, and/or a distance mask describing the distance relationships among the vectors. The orientation mask and the location mask may be determined based on the open vectors. FIGS. 5 and 6 describe examples of relationships used to determine the score matrix.

FIG. 5 illustrates the orientations and locations of the open vectors of FIG. 4. An orientation mask may identify open vectors oriented in opposite directions. Open vectors that point in opposite directions may indicate a possibility that the opening exists between the vectors. Open vectors may point in opposite directions if the difference between the directions of the vectors equals 180 degrees plus or minus a margin of error. As an example, the margin of error may be in the range of 0-20 degrees, such as 5 degrees or 10 degrees. Open vectors that do not point in opposite directions may indicate that the opening does not exist between the vectors. Examples of vectors that do not point in opposite directions include vectors that point in the same direction and vectors that point in perpendicular directions.

In some embodiments, a determination whether vectors point in opposite directions may be made independent of the positions of the vectors. As an example, if a first vector points east and a second vector points west, the vectors may be identified as pointing in opposite directions regardless of their relative positions in the north-south direction. The relative positions of the vectors may affect an angle of alignment of the vectors and, thus, may be taken into consideration when designating corridors as described with respect to FIG. 7 below.

As an example, the vectors of FIG. 5 may yield the following orientation mask, where a "1" indicates the vectors point in opposite directions and a "0" indicates the vectors do not point in opposite directions.

|     | $v_o1$ | $v_o2$ | $v_o3$ | $v_o4$ | $v_o5$ | $v_o6$ | $v_o7$ | $v_o8$ |
|-----|---|---|---|---|---|---|---|---|
| $v_o1$ | 0 | 0 | 0 | 0 | 0 | 0 | 0 | 0 |
| $v_o2$ | 0 | 0 | 1 | 0 | 0 | 1 | 0 | 1 |
| $v_o3$ | 0 | 1 | 0 | 1 | 1 | 0 | 1 | 0 |
| $v_o4$ | 0 | 0 | 1 | 0 | 0 | 1 | 0 | 1 |
| $v_o5$ | 0 | 0 | 1 | 0 | 0 | 1 | 0 | 1 |
| $v_o6$ | 0 | 1 | 0 | 1 | 1 | 0 | 1 | 0 |
| $v_o7$ | 0 | 0 | 1 | 0 | 0 | 1 | 0 | 1 |
| $v_o8$ | 0 | 1 | 0 | 1 | 1 | 0 | 1 | 0 |

A location mask may identify open vectors pointing toward each other. Open vectors that point toward each other may indicate that an opening exists somewhere between the vectors and, therefore, that the vectors possibly point to the same opening. Open vectors that do not point toward each other may indicate that the opening does not exist between the vectors and, therefore, the vectors point to different openings.

In some embodiments, a first open vector may point to a second open vector if the vectors are oriented in opposite directions according to the orientation mask and the second vector is located on the same side of the first vector as the opening indicated by the first vector. As an example, the vectors of FIG. 5 may yield the following location mask, where a "1" indicates the vectors point toward each other and a "0" indicates the vectors do not point toward each other.

|     | $v_o1$ | $v_o2$ | $v_o3$ | $v_o4$ | $v_o5$ | $v_o6$ | $v_o7$ | $v_o8$ |
|-----|---|---|---|---|---|---|---|---|
| $v_o1$ | 0 | 0 | 0 | 0 | 0 | 0 | 0 | 0 |
| $v_o2$ | 0 | 0 | 1 | 0 | 0 | 1 | 0 | 0 |
| $v_o3$ | 0 | 1 | 0 | 0 | 0 | 0 | 1 | 0 |
| $v_o4$ | 0 | 0 | 0 | 0 | 0 | 0 | 0 | 0 |
| $v_o5$ | 0 | 0 | 0 | 0 | 0 | 0 | 0 | 0 |
| $v_o6$ | 0 | 1 | 0 | 0 | 0 | 0 | 1 | 0 |
| $v_o7$ | 0 | 0 | 1 | 0 | 0 | 1 | 0 | 0 |
| $v_o8$ | 0 | 0 | 0 | 0 | 0 | 0 | 0 | 0 |

FIG. 6 illustrates examples of the distances between endpoint e2 and the other endpoints of FIGS. 3-5. As described above, the score matrix may describe the distance between two vectors. The distance between vectors may be given by any suitable function. For example, a Euclidean distance d(a, b) may be calculated between an endpoint "a" of vector $v_o a$ and an endpoint "b" of vector $v_o b$. If the endpoint "a" comprises the coordinates $(a_x, a_y, a_z)$ and the endpoint "b" comprises the coordinates $(b_x, b_y, b_z)$, then the distance may be given by:

$$d(a,b) = \sqrt{(ax-bx)^2 + (ay-by)^2 + (az-bz)^2}$$

The distances between the other combinations of endpoint pairs may be described in a similar manner. The distances between the combinations of endpoint pairs of FIG. 6 may be arranged in the following distance mask:

|     | $v_o1$ | $v_o2$ | $v_o3$ | $v_o4$ | $v_o5$ | $v_o6$ | $v_o7$ | $v_o8$ |
|-----|---|---|---|---|---|---|---|---|
| $v_o1$ | 0 | d(e1, e2) | d(e1, e3) | d(e1, e4) | d(e1, e5) | d(e1, e6) | d(e1, e7) | d(e1, e8) |
| $v_o2$ | X | 0 | d(e2, e3) | d(e2, e4) | d(e2, e5) | d(e2, e6) | d(e2, e7) | d(e2, e8) |
| $v_o3$ | X | X | 0 | d(e3, e4) | d(e3, e5) | d(e3, e6) | d(e3, e7) | d(e3, e8) |
| $v_o4$ | X | X | X | 0 | d(e4, e5) | d(e4, e6) | d(e4, e7) | d(e4, e8) |
| $v_o5$ | X | X | X | X | 0 | d(e5, e6) | d(e5, e7) | d(e5, e8) |
| $v_o6$ | X | X | X | X | X | 0 | d(e6, e7) | d(e6, e8) |
| $v_o7$ | X | X | X | X | X | X | 0 | d(e7, e8) |
| $v_o8$ | X | X | X | X | X | X | X | 0 |

In some embodiments, the score matrix may be defined by multiplying the orientation mask, the location mask, and the distance mask. That is, values having a common location in each mask may be multiplied together. As an example, the score matrix value for the $v_o3$-$v_o4$ combination of FIGS. 3-6 may be calculated by multiplying the orientation mask value of 1, the location mask value of 0, and the distance mask value of d(e3,e4) to yield a score matrix value of 0. Similar calculations may be performed for the other combinations of example vectors to yield the following score matrix:

|     | $v_o1$ | $v_o2$ | $v_o3$ | $v_o4$ | $v_o5$ | $v_o6$ | $v_o7$ | $v_o8$ |
|-----|---|---|---|---|---|---|---|---|
| $v_o1$ | 0 | 0 | 0 | 0 | 0 | 0 | 0 | 0 |
| $v_o2$ | X | 0 | d(e2,e3) | 0 | 0 | d(e2,e6) | 0 | 0 |
| $v_o3$ | X | X | 0 | 0 | 0 | 0 | d(e3,e7) | 0 |
| $v_o4$ | X | X | X | 0 | 0 | 0 | 0 | 0 |
| $v_o5$ | X | X | X | X | 0 | 0 | 0 | 0 |
| $v_o6$ | X | X | X | X | X | 0 | d(e6,e7) | 0 |
| $v_o7$ | X | X | X | X | X | X | 0 | 0 |
| $v_o8$ | X | X | X | X | X | X | X | 0 |

Referring back to FIG. 2, the method identifies candidate corridors according to the score matrix at step 220. Vector pairs having score matrix values less than a minimum score may not be designated as candidate corridors. For example, a score matrix value of zero may indicate that the orientation and/or location of the vector pair fails to indicate a corridor.

As another example, a relatively small score matrix value, such as less than a few inches, may indicate that an error occurred in the sensor data or that the opening in the wall is non-navigable. Score matrix values exceeding the minimum score may be designated as candidate corridors. In some embodiments, the minimum score may be a value in the range of less than 2, 2-6, 6-12, or 12-20 inches.

At step 224, the candidate corridors may be further identified as either candidate doorways or candidate gaps. A candidate corridor may be identified as a doorway if its width is approximately equal to that of a typical doorway. The corridor width may be the distance between structural features that define the corridor, as indicated by the score matrix value. A score matrix value indicating a width of a typical doorway may be approximately one meter. In some embodiments, the typical doorway width may be a value in the range of 0.4-0.8, 0.8-1.2, or 1.2-2.0 meters. In some embodiments, a candidate corridor may be identified as a gap if the score matrix value exceeds the width of a typical doorway. A gap may indicate the presence of certain internal features of the structures 20, such as stairwells.

Figure 7:
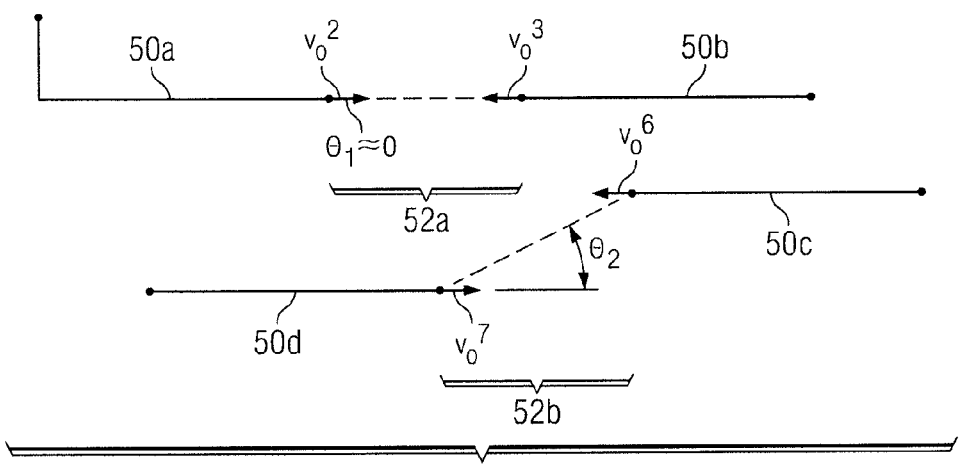
FIG. 7 illustrates examples of alignment angles for designating a corridor.

Designated corridors may be designated from the candidate corridors at step 228. In some embodiments, a designated corridor may be a corridor having a substantially aligned alignment angle. The alignment angle may indicate an alignment of the corridor and the structural features that define the corridor. FIG. 7 illustrates examples of alignment angles $\theta_1$ and $\theta_2$ of candidate corridors 52a and 52b respectively. If an alignment angle $\theta$ is greater than a threshold angle, then the vectors are not substantially aligned. The threshold angle may have any suitable value, such as a value in the range of 0 to 45 degrees, for example, 15 degrees.

Figure 8:
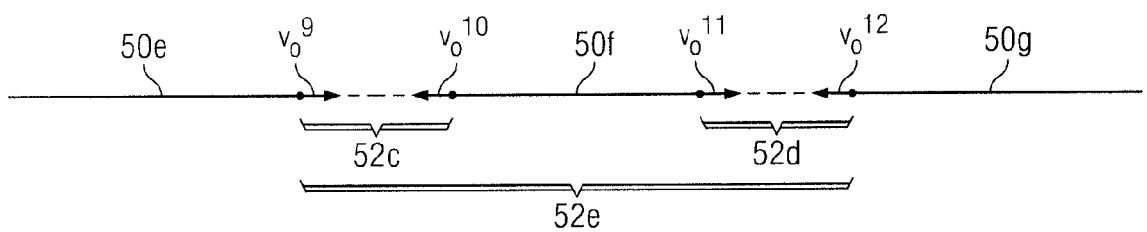
FIG. 8 illustrates an example of more than one candidate corridor located between vectors.

In some embodiments, a maximum of one corridor per open vector may be designated for a particular angle of alignment. As an example, FIG. 8 illustrates a structure having three substantially aligned wall features 50e, 50f, and 50g with a first opening defined by wall features 50e and 50f and a second opening defined by wall features 50f and 50g. The wall features may be represented by open vectors as shown. A score matrix of the vectors may identify candidate corridor 52c for the first opening and candidate corridor 52d for the second corridor. In addition, the score matrix may identify candidate corridor 52e defined by wall feature 50e and 50g based on the orientation and location of vectors $v_o9$ and $v_o12$. Candidate corridor 52e, however, should not be designated as a designated corridor because wall feature 50f precludes navigability for a portion of candidate corridor 52e. Accordingly, the candidate corridor having the smallest width may be selected as the only designated corridor for a particular vector at a particular alignment angle. As an example, for vector $v_o9$, candidate corridor 52c may be designated and candidate corridor 52e may not be designated.

Referring back to FIG. 2, one or more structures 20 are estimated at step 232. In certain embodiments, the layout of structures 20 is determined. The layout may indicate structural features, such as walls and corners, as well as designated corridors, such as doorways and gaps, of structures 20. The method then terminates.

Modifications, additions, or omissions may be made to system 10 without departing from the scope of the invention. The components of system 10 may be integrated or separated. Moreover, the operations of system 10 may be performed by more, fewer, or other components. For example, the operations of sensors 29 and computing system 26 may be performed by one component, or the operations of layout generator 38 may be performed by more than one component. As used in this document, "each" refers to each member of a set or each member of a subset of a set. A subset may include 0, 1, or more members.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising: receiving sensor data generated in response to sensing one or more structures, the sensor data describing a plurality of structural features of the structures; identifying the structural features of the sensor data; representing each structural feature by one or more vectors to yield a plurality of vectors; generating a score matrix that describes a plurality of relationships among the vectors; identifying one or more candidate corridors from at least some of the vectors according to the score matrix; designating one or more candidate corridors as designated corridors, each designated corridor comprising an opening defined by at least two structural features; and generating a layout of the one or more structures from the structural features and the designated corridors,
wherein the structural features are represented by at least one endpoint and a set of vectors comprising at least one open vector and at least one closed vector different from the open vector, the at least one open vector originating at the endpoint of a wall and pointing in the direction of a space adjacent to an excluding the wall, and the at least one closed vector originating at the at least one endpoint and pointing towards the wall.

2. The method of claim 1, a relationship of the plurality of relationships comprising an orientation relationship indicating a subset of vectors that point in opposite directions.

3. The method of claim 1, a relationship of the plurality of relationships comprising a location relationship indicating a subset of vectors that point toward each other.

4. The method of claim 1, a relationship of the plurality of relationships comprising a distance relationship indicating one or more distances from each vector to each other vector.

5. The method of claim 1, the generating the score matrix further comprising: assigning a plurality of score matrix values to each vector, each score matrix value describing one or more relationships among the each vector and a particular other vector, the assigning comprising: assigning the score matrix value of zero if the each vector and the particular other vector do not point toward each other; and assigning a score matrix value equal to a distance between the each vector and the particular other vector if the each vector and the particular other vector point toward each other.

6. The method of claim 1, further comprising: the generating the score matrix further comprising: assigning a plurality of score matrix values to each vector, each score matrix value describing one or more relationships among the each vector and a particular other vector; and the identifying one or more candidate corridors from at least some of the vectors according to the score matrix further comprising: identifying the candidate corridor if the score matrix value exceeds a minimum score.

7. The method of claim 1, the identifying one or more candidate corridors further comprising: identifying a candidate corridor as a candidate doorway if a distance between the vectors of the candidate corridor is less than or equal to a width of a typical doorway; and identifying a candidate corridor as a candidate gap if the distance between the vectors of the candidate corridor exceeds the width of the typical doorway.

8. The method of claim 1, the designating one or more candidate corridors further comprising: designating a candidate corridor as a designated corridor if the candidate corridor and the at least two structural features defining the candidate corridor are substantially aligned.

9. The method of claim 1, the designating one or more candidate corridors further comprising: determining an alignment angle indicating an alignment of a candidate corridor and the at least two structural features defining the candidate corridor; comparing the alignment angle to a threshold angle; and designating the candidate corridor as a designated corridor if the alignment angle does not exceed the threshold angle.

10. The method of claim 1, the designating one or more candidate corridors further comprising: identifying one or more subsets of candidate corridors, a subset comprising candidate corridors having a vector in common and substantially the same alignment angle, the alignment angle indicating the alignment of the candidate corridor and the at least two structural features defining the candidate corridor; and designating a maximum of one designated corridor for each subset of candidate corridors.

11. A system comprising: an interface operable to: receive sensor data generated in response to sensing one or more structures, the sensor data describing a plurality of structural features of the structures; and a processor operable to: identify the structural features of the sensor data; represent each structural feature by one or more vectors to yield a plurality of vectors; generate a score matrix that describes a plurality of relationships among the vectors; identify one or more candidate corridors from at least some of the vectors according to the score matrix; designate one or more candidate corridors as designated corridors, each designated corridor comprising an opening defined by at least two structural features; and generate a layout of the one or more structures from the structural features and the designated corridors, wherein the structural features are represented by at least one endpoint and a set of vectors comprising at least one open vector and at least one closed vector different from the open vector, the at least one open vector originating at the endpoint of a wall and pointing in the direction of a space adjacent to an excluding the wall, and the at least one closed vector originating at the at least one endpoint and pointing towards the wall.

12. The system of claim 11, a relationship of the plurality of relationships comprising an orientation relationship indicating a subset of vectors that point in opposite directions.

13. The system of claim 11, a relationship of the plurality of relationships comprising a location relationship indicating a subset of vectors that point toward each other.

14. The system of claim 11, a relationship of the plurality of relationships comprising a distance relationship indicating one or more distances from each vector to each other vector.

15. The system of claim 11, the processor operable to generate the score matrix by: assigning a plurality of score matrix values to each vector, each score matrix value describing one or more relationships among the each vector and a particular other vector, the assigning comprising: assigning the score matrix value of zero if the each vector and the particular other vector do not point toward each other; and assigning a score matrix value equal to a distance between the each vector and the particular other vector if the each vector and the particular other vector point toward each other.

16. The system of claim 11, further comprising: the processor operable to generate the score matrix by: assigning a plurality of score matrix values to each vector, each score matrix value describing one or more relationships among the each vector and a particular other vector; and the processor operable to identify one or more candidate corridors from at least some of the vectors according to the score matrix by: identifying the candidate corridor if the score matrix value exceeds a minimum score.

17. The system of claim 11, the processor operable to identify one or more candidate corridors by: identifying a candidate corridor as a candidate doorway if a distance between the vectors of the candidate corridor is less than or equal to a width of a typical doorway; and identifying a candidate corridor as a candidate gap if the distance between the vectors of the candidate corridor exceeds the width of the typical doorway.

18. The system of claim 11, the processor operable to designate one or more candidate corridors by: designating a candidate corridor as a designated corridor if the candidate corridor and the at least two structural features defining the candidate corridor are substantially aligned.

19. The system of claim 11, the processor operable to designate one or more candidate corridors by: determining an alignment angle indicating an alignment of a candidate corridor and the at least two structural features defining the candidate corridor; comparing the alignment angle to a threshold angle; and designating the candidate corridor as a designated corridor if the alignment angle does not exceed the threshold angle.

20. The system of claim 11, the processor operable to designate one or more candidate corridors by: identifying one or more subsets of candidate corridors, a subset comprising candidate corridors having a vector in common and substantially the same alignment angle, the alignment angle indicating the alignment of the candidate corridor and the at least two structural features defining the candidate corridor; and designating a maximum of one designated corridor for each subset of candidate corridors.

* * * * *